US012739853B2

(12) United States Patent
Panzner et al.

(10) Patent No.: US 12,739,853 B2
(45) Date of Patent: Sep. 15, 2026

(54) RESOURCE ALLOCATION FOR SIDELINK COMMUNICATION

(71) Applicant: Nokia Technologies Oy, Espoo (FI)

(72) Inventors: Berthold Panzner, Munich (DE); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 316 days.

(21) Appl. No.: 18/502,599

(22) Filed: Nov. 6, 2023

(65) Prior Publication Data

US 2024/0172247 A1 May 23, 2024

(30) Foreign Application Priority Data

Nov. 11, 2022 (FI) ...................................... 20226015

(51) Int. Cl.
*H04W 72/232* (2023.01)
*H04W 72/40* (2023.01)

(52) U.S. Cl.
CPC ......... *H04W 72/232* (2023.01); *H04W 72/40* (2023.01)

(58) Field of Classification Search
CPC ... H04W 72/232; H04W 72/40; H04W 92/18; H04W 88/04; H04W 72/02; H04W 72/04; H04W 72/20; H04W 76/14; H04L 5/0053
USPC .......................................................... 370/329
See application file for complete search history.

(56) References Cited

U.S. PATENT DOCUMENTS

2016/0295624 A1 10/2016 Novian et al.
2021/0400689 A1 12/2021 Wang et al.
2022/0039066 A1 2/2022 Lu et al.
2022/0086803 A1 3/2022 Li et al.
2022/0182994 A1* 6/2022 Yoshioka .............. H04W 72/20
2022/0400531 A1* 12/2022 Back ...................... H04W 76/28
2023/0328812 A1* 10/2023 Back ......................... H04B 7/15
2023/0363047 A1* 11/2023 Back ...................... H04W 76/14
(Continued)

FOREIGN PATENT DOCUMENTS

EP 3761546 A1 1/2021
WO 2021/159325 A1 8/2021
(Continued)

OTHER PUBLICATIONS

3GPP TSG-RAN WG2 Meeting #120 R2-2211606 (Year: 2022).*
(Continued)

*Primary Examiner* — Nicholas A Jensen
*Assistant Examiner* — Oladiran Gideon Olaleye
(74) *Attorney, Agent, or Firm* — Robert P. Michal, Esq.; Rimon PC

(57) ABSTRACT

There is provided an apparatus, comprising: at least one processor; and at least one memory storing instructions that, when executed by the at least one processor, cause the apparatus at least to perform: receiving a configuration indicative of at least a first resource pool and a second resource pool, wherein the first resource pool is for a different purpose than the second resource pool; receiving downlink control information comprising a resource allocation parameter defining allocated resources in the first resource pool or allocated resources in the second resource pool; and determining, based on the resource allocation parameter, allocated resources in the first resource pool or in the second resource pool.

1 Claim, 9 Drawing Sheets

(56) References Cited

U.S. PATENT DOCUMENTS

2023/0370942 A1* 11/2023 Zhou ................. H04W 52/0216
2024/0048324 A1* 2/2024 Li ......................... H04L 5/0048
2024/0121804 A1* 4/2024 Li ......................... H04W 72/25
2024/0172255 A1* 5/2024 Luo ....................... H04W 8/005

FOREIGN PATENT DOCUMENTS

WO 2022/077983 A1 4/2022
WO 2022/188685 A1 9/2022

OTHER PUBLICATIONS

Extended European Search Report received for corresponding European Patent Application No. 23204774.6, dated Apr. 25, 2024, 13 pages.
"3rd Generation Partnership Project; Technical Specification Group Radio Access Network; NR; Multiplexing and channel coding (Release 17)", 3GPP TS 38.212, V17.3.0, Sep. 2022, pp. 1-201.
"Corrections on resource pool index", 3GPP TSG-RAN WG1 Meeting #110bis-e, R1-2210524, vivo, Oct. 10-19, 2022, 2 pages.
"Reply LS on resource pool index in DCI Format 3_0", 3GPP TSG-RAN WG1 Meeting #110bis-e, R1-2210585, RAN1, Oct. 10-19, 2022, 2 pages.
"3rd Generation Partnership Project; Technical Specification Group Radio Access Network; NR; Physical layer procedures for data (Release 17)", 3GPP TS 38.214, V17.3.0, Sep. 2022, pp. 1-232.
Office action received for corresponding Finnish Patent Application No. 20226015, dated Jun. 6, 2023, 16 pages.
"5G; NR; Physical layer procedures for control (3GPP TS 38.213 version 17.3.0 Release 17)", ETSI TS 138 213, V17.3.0, Sep. 2022, 262 pages.
"Summary of AI 6.7.2.5 on Discovery and relay re/selection", 3GPP TSG-RAN WG2 Meeting #118 electronic, R2-220xxxx, Agenda: 6.7.2.5, vivo, May 9-20, 2022, 27 pages.
International Search Report and Written Opinion received for corresponding Patent Cooperation Treaty Application No. PCT/IB2023/061187, dated Feb. 7, 2024, 15 pages.
"Discussion on the support of discovery RP scheduling", 3GPP TSG-RAN WG2 Meeting #120, R2-2211606, Agenda: 6.7.2, Huawei, Nov. 14-18, 2022, 3 pages.
"Further discussion on reply LS in R1-2210585 on Resource pool index in DCI Format 3_0", 3GPP TSG-RAN WG2 Meeting #120, R2-2211669, Agenda: 6.7.1, vivo, Nov. 14-18, 2022, 10 pages.
"Discussion on resource pool index in DCI Format 3_0 for SL discovery", 3GPP TSG-RAN WG1 Meeting #110bis-e, R1-2208814, Agenda: 5, OPPO, Oct. 10-19, 2022, 2 pages.
"On the mapping of the resource pool index in DCI format 3_0", 3GPP TSG-RAN WG2 Meeting #120, R2-2212399, Agenda: 6.7.2, Nokia, Nov. 14-18, 2022, 2 pages.
3rd Generation Partnership Project; Technical Specification Group Radio Access Network; NR; Radio Resource Control (RRC) protocol specification (Release 17), 3GPP TS 38.331, V17.5.0, Jun. 2023, pp. 1-1328.
Office action received for corresponding Finnish Patent Application No. 20226015, dated Oct. 11, 2024, 11 pages.
Notice of Allowance received for corresponding European Patent Application No. 23204774.6, dated Feb. 2, 2025, 7 pages.
"RAN1 Chair's Notes", 3GPP TSG RAN WG1 #109e, e-Meeting, May 9-20, 2022.

* cited by examiner

RESOURCE ALLOCATION FOR SIDELINK COMMUNICATION

RELATED APPLICATION

This application claims priority to FI Application No. 20226015 filed Nov. 11, 2022, which is incorporated herein by reference in its entirety.

FIELD

Various example embodiments relate to resource allocation for sidelink communication, for example, for a sidelink relay.

BACKGROUND

Sidelink (SL) communication refers to direct communication between two devices, e.g. user equipments, without participation of a base station. SL technology may be used in cellular communication networks, such as, in cellular communication networks operating according to 5G radio access technology. 5G radio access technology may also be referred to as New Radio, NR, access technology. 3rd Generation Partnership Project, 3GPP, develops standards for 5G/NR and one of the topics in the 3GPP discussions is related to SL communication. According to the discussions there is a need to provide enhanced methods, apparatuses and computer programs related to SL communication in cellular communication networks. Such enhancements may also be beneficial in other wireless communication networks, such as in 6G networks in the future, as well.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to an aspect, there is provided a method, comprising: receiving, by a user equipment, a configuration indicative of at least a first resource pool and a second resource pool, wherein the first resource pool is for a different purpose than the second resource pool; receiving, by the user equipment, downlink control information comprising a resource allocation parameter defining allocated resources in the first resource pool or allocated resources in the second resource pool; and determining, based on the resource allocation parameter, allocated resources in the first resource pool or in the second resource pool. The method may be performed by a user equipment.

According to an embodiment, the method comprises: based on determining that the allocated resources are in the first resource pool, performing transmission on the allocated resources in the first resource pool; or based on determining that the allocated resources are in the second resource pool, performing discovery on the allocated resources in the second resource pool.

According to an embodiment, the apparatus is configured to act as a sidelink relay; and the first resource pool comprises at least one shared resource pool and the second resource pool comprises at least one discovery resource pool.

According to an embodiment, the resource allocation parameter is an integer; and wherein an odd resource allocation parameter corresponds to the first resource pool; and an even resource allocation parameter corresponds to the second resource pool.

According to an embodiment, the resource allocation parameter is an integer; and wherein an even resource allocation parameter corresponds to the first resource pool; and an odd resource allocation parameter corresponds to the second resource pool.

According to an embodiment, the resource allocation parameter is a value in a range comprising a first range and a second range; and wherein a value in the first range corresponds to the first resource pool; and a value in the second range corresponds to the second resource pool.

According to an embodiment, sizes of the first range and the second range have been pre-configured.

According to an embodiment, sizes of the first range and the second range depend on a channel busy ratio.

According to an embodiment, an association between the resource allocation parameter and allocated resources in the first resource pool or in the second resource pool is based on a mapping, which is known to the apparatus.

According to an embodiment, the resource allocation parameter corresponds to the first resource pool, if a time slot associated with a grant indicated in the downlink control information is odd; and the resource allocation parameter corresponds to the second resource pool, if a time slot associated with a grant indicated in the downlink control information is even.

According to an embodiment, the resource allocation parameter corresponds to the first resource pool, if a time slot associated with a grant indicated in the downlink control information is even; and the resource allocation parameter corresponds to the second resource pool, if a time slot associated with a grant indicated in the downlink control information is odd.

According to an embodiment, the resource allocation parameter corresponds to the first resource pool, if a time gap indicated in the downlink control information is odd; and the resource allocation parameter corresponds to the second resource pool, if a time gap indicated in the downlink control information is even.

According to an embodiment, the resource allocation parameter corresponds to the first resource pool, if a time gap indicated in the downlink control information is even; and the resource allocation parameter corresponds to the second resource pool, if a time gap indicated in the downlink control information is odd.

According to an embodiment, the resource allocation parameter is a resource pool index in downlink control information format 3_0.

According to an aspect, there is provided an apparatus comprising means for performing at least the method of the above aspect and any of the embodiments thereof. The apparatus may be a user equipment.

According to an embodiment, the means comprises comprises at least one processor; and at least one memory storing instructions that, when executed by the at least one processor, cause the performance of the apparatus. The apparatus may be a user equipment.

According to an aspect, there is provided a computer readable medium comprising instructions that, when executed by an apparatus, cause the apparatus to perform at least the method of the aspect above and any of the embodiments thereof. The apparatus may be a user equipment.

According to an aspect, there is provided a computer program comprising instructions, which, when executed by an apparatus, cause the apparatus to perform the method of the aspect above and any of the embodiments thereof. The apparatus may be a user equipment.

According to an aspect, there is provided a method, comprising: transmitting, by a network node to a user equipment, a configuration indicative of at least a first resource pool and a second resource pool, wherein the first resource pool is for a different purpose than the second resource pool; and transmitting, to the user equipment, downlink control information comprising a resource allocation parameter defining allocated resources in the first resource pool or allocated resources in the second resource pool. The method may be performed by a network node.

According to an embodiment, an association between the resource allocation parameter and allocated resources in the first resource pool or in the second resource pool is based on a mapping, which is known to the user equipment configured to act as a sidelink relay.

According to an aspect, there is provided an apparatus comprising means for performing the method of the above aspect and any of the embodiments thereof. The apparatus may be a network node.

According to an embodiment, the means comprises comprises at least one processor; and at least one memory storing instructions that, when executed by the at least one processor, cause the performance of the apparatus. The apparatus may be a network node.

According to an aspect, there is provided a computer readable medium comprising instructions that, when executed by an apparatus, cause the apparatus to perform at least the method of the aspect above and any of the embodiments thereof. The apparatus may be a network node.

According to an aspect, there is provided a computer program comprising instructions, which, when executed by an apparatus, cause the apparatus to perform the method of the aspect above and any of the embodiments thereof. The apparatus may be a network node.

BRIEF DESCRIPTION OF THE DRAWINGS

Some example embodiments will now be described with reference to the accompanying drawings.

DETAILED DESCRIPTION

Figure 1:
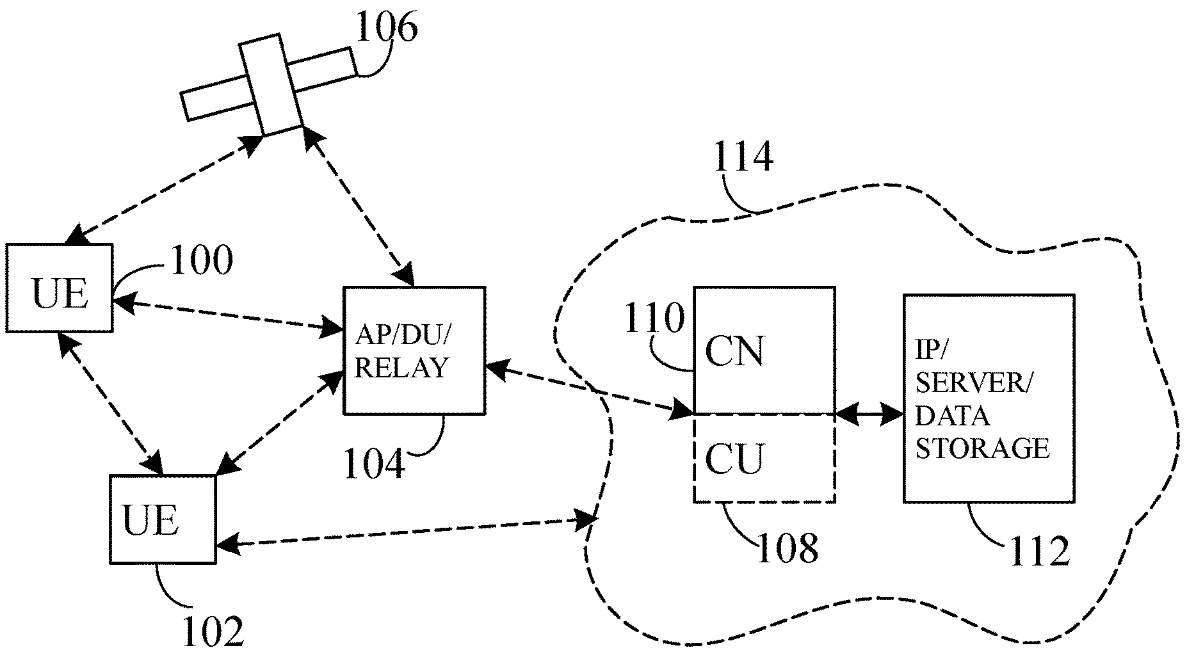
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices or user equipments (UEs) 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 GHz, cmWave and mmWave, and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 7 GHz-cmWave, below 7 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

Figure 2:
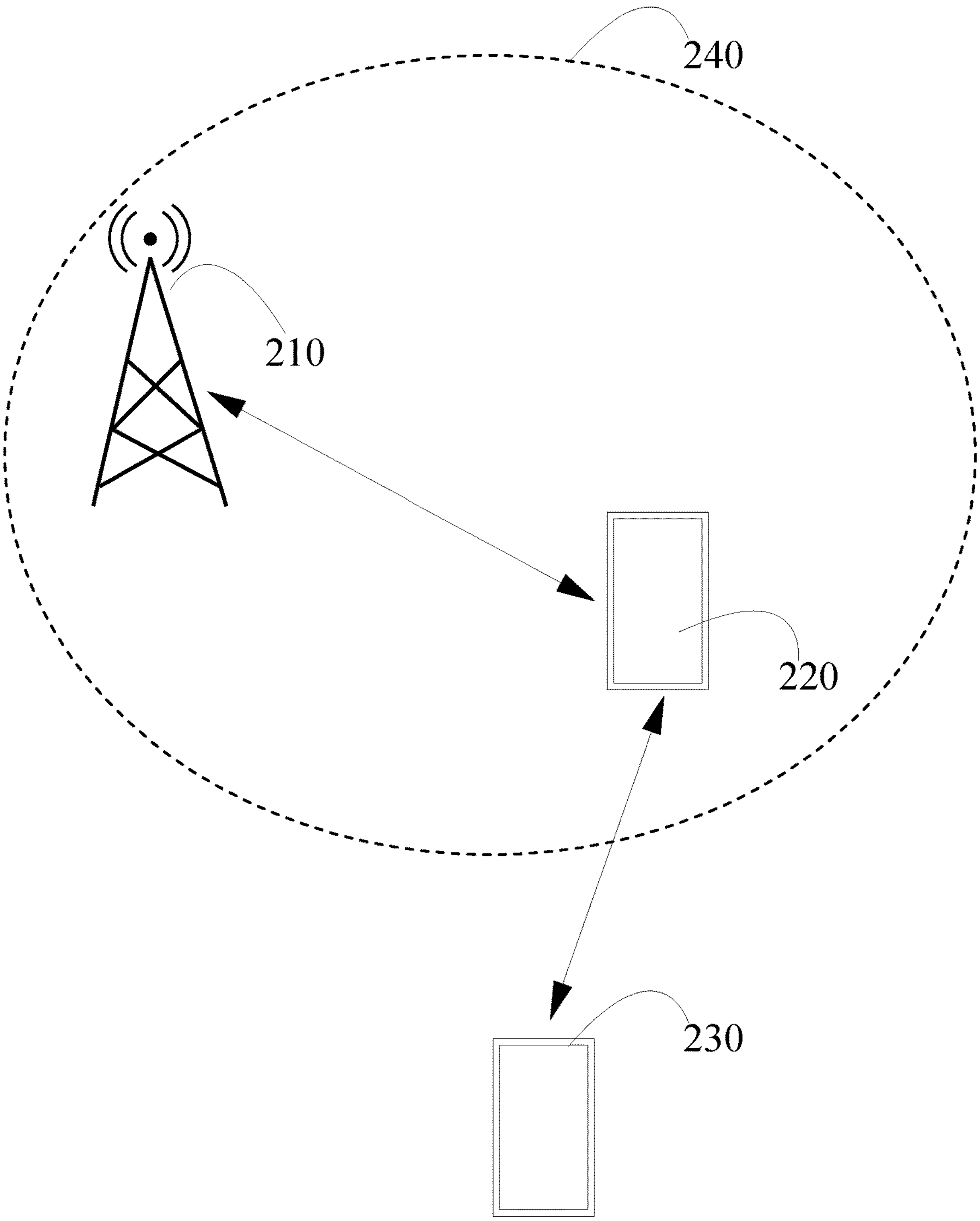
FIG. 2 shows, by way of example, sidelink communication.

FIG. 2 shows, by way of example, sidelink communication. In sidelink (SL) communication, direct communication between UEs 220, 230 is allowed without communicating through a base station 210. Proximity based services refer to a device-to-device (D2D) technology that allow the UEs to detect each other and communicate with each other, when the UEs are in close vicinity with each other. A SL relay is a UE that is able to act as a relay between the network and another UE, which is out of coverage. For example, the UE 220 may act as a relay, which enables indirect communication between the network 210 and UE(s) 230 that is/are out of coverage 240 of the network.

The UE acting as a relay may perform discovery to find other UEs for SL communication.

Allocated resources for the UE may be indicated via downlink control information (DCI), which may be transmitted by the network to the UE. DCI has many formats for different purposes. For example, DCI format 3_0 has been defined for scheduling of sidelink. DCI format 3_0 may be used for scheduling of new radio (NR) physical sidelink control channel (PSCCH) and NR physical sidelink shared channel (PSSCH).

A plurality of information elements (IEs) may be transmitted via DCI format 3_0, for example, with cyclic redundancy check (CRC) scrambled by sidelink radio network temporary identifier (SL-RNTI) or sidelink configured scheduling radio network temporary identifier (SL-CS-RNTI). For example, resource pool index or resource allocation parameter may define resource pools for transmission configured by a higher layer parameter. As another example, time gap may define a number of slots between DCI reception and the first SL transmission scheduled by the DCI.

Network may allocate resources for the UE for different purposes. For example, higher layer parameter sl-TxPoolScheduling refers to a shared resource pool. As another example, higher layer parameter sl-DiscTxPoolScheduling refers to a discovery resource pool. The shared resource pool may be for transmission purposes. Resources of the shared resource pool may be used for transmission of any data. In at least some embodiments, resources of the shared resource pool are not for transmission of discovery messages. For example, if both the shared resource pool and the discovery resource pool have been configured, resources of the shared resource pool are not for transmission of discovery messages. The discovery resource pool may be for discovery purposes. Resources of the discovery resource pool may be dedicated for transmission of discovery messages, for example, only for transmission of discovery messages.

If sl-DiscTxPoolScheduling has not been configured, the shared resource pool may transmit any data, for example, discovery messages.

Both resources pools, the shared resource pool and the discovery resource pool, may be configured simultaneously. Thus, UE may need to know which resources have been allocated for the shared resource pool and which resources have been allocated for the discovery resource pool so that the UE is aware what type of transmissions it may transfer via the allocated resources. However, DCI format 3_0 has one IE for indicating the allocated resource(s), and therefore, it may be ambiguous for the UE. It might not be clear for the UE whether the resource pool index applies to a shared resource pool or to a discovery resource pool.

Methods are provided to enable the UE to determine the scheduled resource pool corresponding to the resource pool index of DCI format 3_0, when both the shared resource pool and the discovery resource pool have been configured.

Figure 3A:
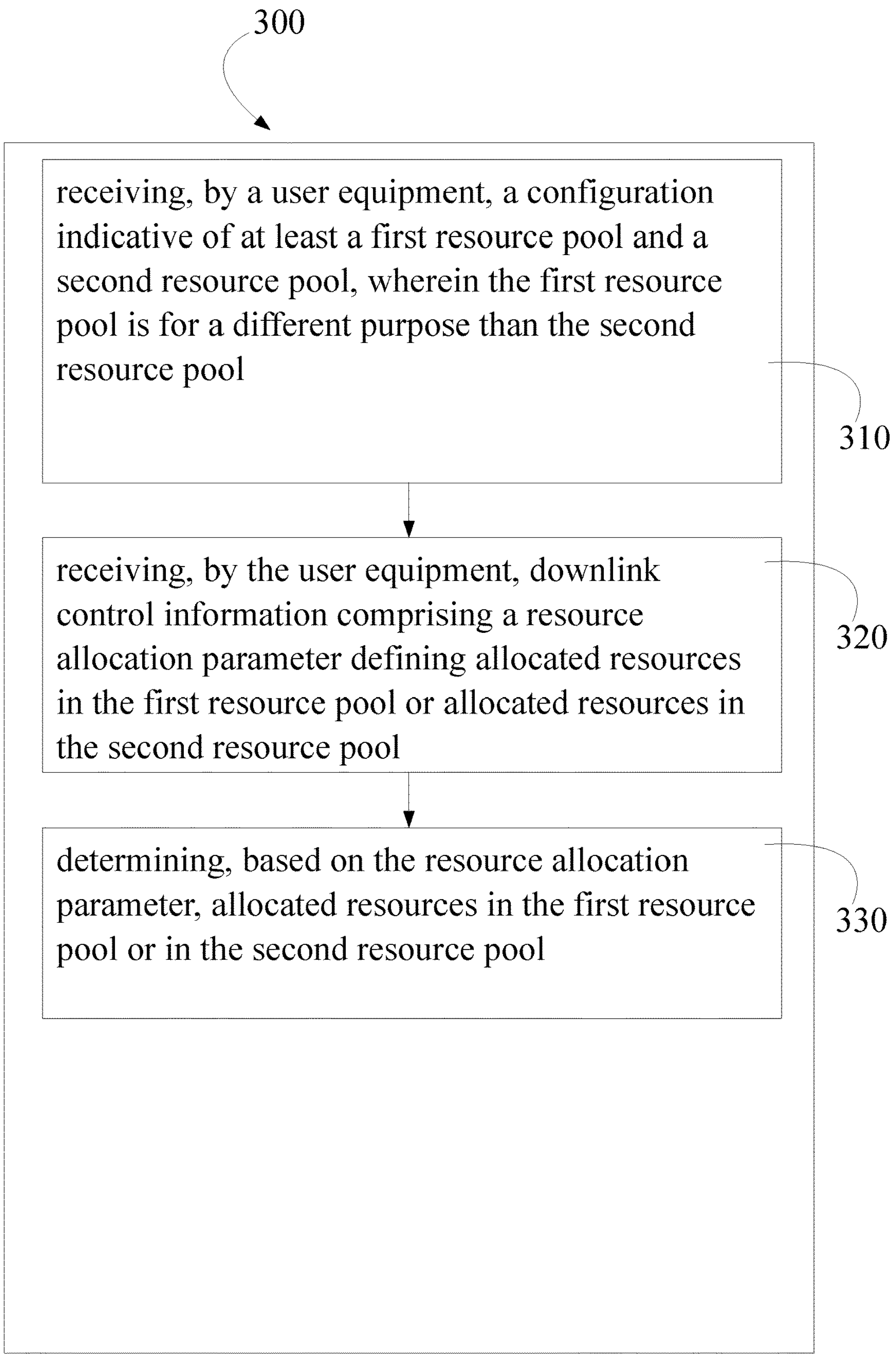
FIG. 3*a* shows, by way of example, a flowchart of a method.

FIG. 3*a* shows, by way of example, a flowchart of a method. The phases of the illustrated method may be performed by an apparatus, e.g. UE, or by a control device configured to control the functioning thereof, when installed therein. The UE may be, for example, the device 220 of FIG. 2, which is configured to perform at least the method 300. The UE may be configured to act as SL relay. The method 300 comprises receiving 310, by a user equipment, a configuration indicative of at least a first resource pool and a second resource pool, wherein the first resource pool is for a different purpose than the second resource pool. The method 300 comprises receiving 320, by the user equipment, downlink control information comprising a resource allocation parameter defining allocated resources in the first resource pool or allocated resources in the second resource pool. The method 300 comprises determining 330, based on the resource allocation parameter, allocated resources in the first resource pool or in the second resource pool.

The method as disclosed herein enables mapping of the resource allocation parameter (e.g. resource pool index) indicated in the DCI to allocated resources when both shared and dedicated pool are configured. The DCI may be DCI format 3_0. The method as discloses herein enables unique mapping between the resource allocation parameter and the allocated resources without changing of the abstract syntax notation one (ASN.1) of the DCI format 3_0 and without introducing new information elements to the DCI and without introducing a new DCI format. Backward compatibility between previous definitions of the DCI format 3_0 is maintained by the method as disclosed herein.

Figure 3B:
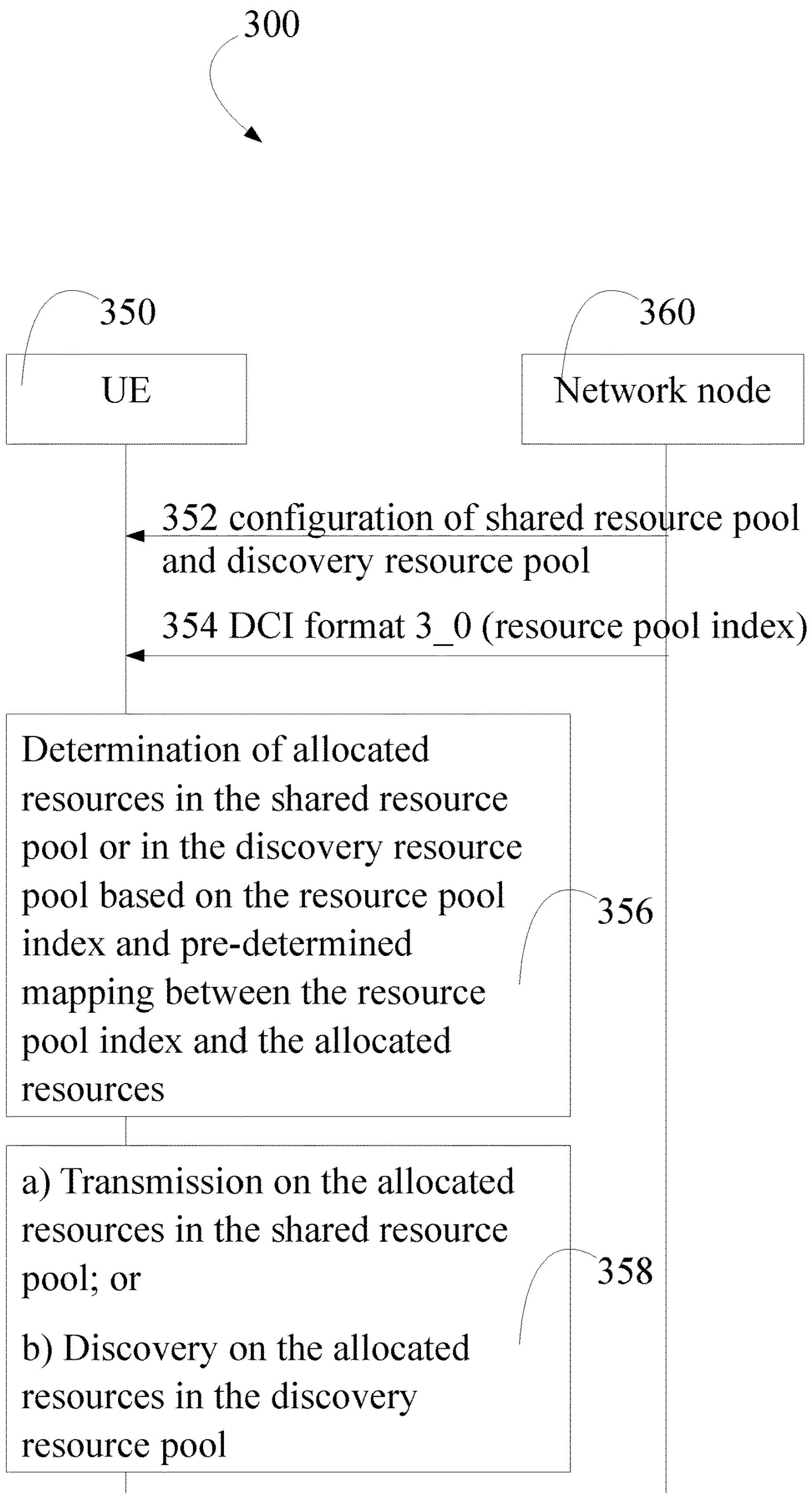
FIG. 3*b* shows, by way of example, signalling between entities.

FIG. 3*b* shows, by way of example, signalling between entities. The UE 350 may receive a configuration 352 indicative of at least a first resource pool and a second resource pool. The first resource pool may be for a different purpose than the second resource pool. For example, the first resource pool may be a shared resource pool, and the second resource pool may be a discovery resource pool. The UE 350 may be configured to act as a SL relay.

The UE may receive DCI, e.g. DCI format 3_0 354, comprising a resource allocation parameter. The resource allocation parameter may be, for example, a resource pool index in the DCI format 3_0. The single resource allocation parameter defines allocated resources in the first resource pool or allocated resources in the second resource pool according to a mapping. The mapping may be pre-determined and known to the UE.

The UE may determine 356, based on the resource allocation parameter (resource pool index), allocated resources in the first resource pool (shared resource pool) or in the second resource pool (discovery resource pool).

The first resource pool may comprise shared resources pools, e.g. shared RP1, shared RP2, shared RP3, etc. The second resource pool may comprise dedicated resource pools, e.g. dedicated RP1, dedicated RP2, dedicated RP3, etc.

Association between the resource allocation parameter and allocated resources may be based on a mapping, which is known to the UE. This mapping may have been preconfigured so that the UE is able to associate the resource allocation parameter to the correct resource pool. A single resource allocation parameter may be used to indicate allocated resources to the UE, when resources for different purposes have been configured.

If the resource allocation parameter points to resources in the shared resource pool, the UE 350 may perform 358*a* transmission on the allocated resources in the shared resource pool. If the resource allocation parameter points to resources in the discovery resource pool, the UE 350 may perform 358*b* discovery on the allocated resources in the discovery resource pool.

Figure 4A:
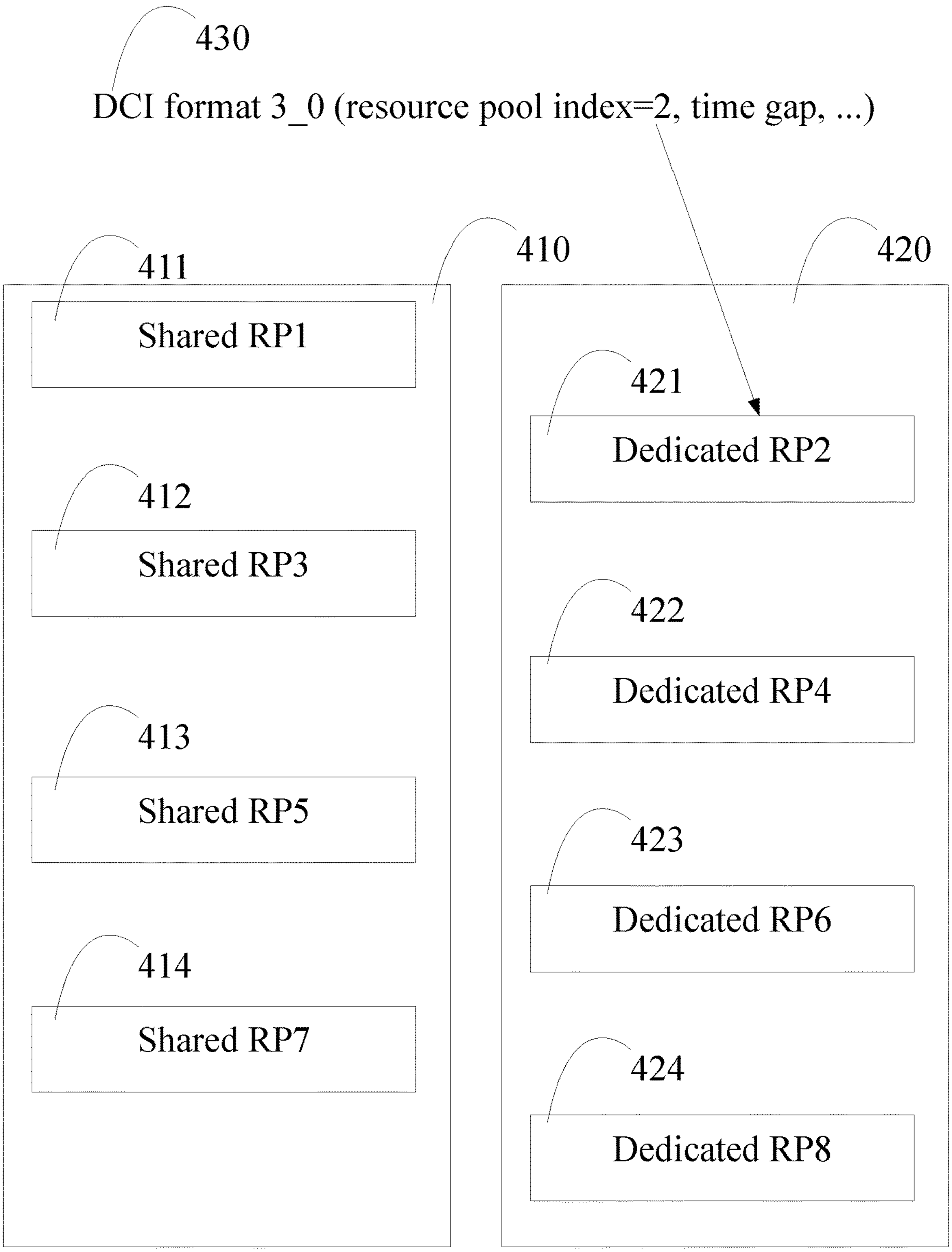
FIG. 4*a* shows, by way of example, a mapping between a resource allocation parameter and at least one resource pool.

FIG. 4*a* shows, by way of example, a mapping between a resource allocation parameter and at least one resource pool. For example, the resource allocation parameter may be an integer. The resource allocation parameter may be configured as a pattern, wherein an odd resource allocation parameter corresponds to the first resource pool 410, and an even resource allocation parameter corresponds to the second resource pool 420. For example, indices 1, 3, 5, 7, . . . may refer to the first resource pool 410 and shared resource pools 411, 412, 413, 414; and indices 2, 4, 6, 8, . . . may refer to the second resource pool 420 and dedicated resource pools 421, 422, 423, 424. Index 1 may refer to the shared RP1, index 3 may refer to the shared RP3, index 5 may refer to the shared RP5 and index 7 may refer to the shared RP7. Index 2 may refer to the dedicated RP2, index 4 may refer to the dedicated RP4, index 6 may refer to the dedicated RP6 and index 8 may refer to the dedicated RP8.

Let us consider an example, that the DCI 430 received by the UE is indicative of a resource allocation parameter or resource pool index "2". Thus, the index is even and corresponds to the dedicated RP2 421 in the second resource pool 420, i.e. the discovery resource pool.

Figure 4B:
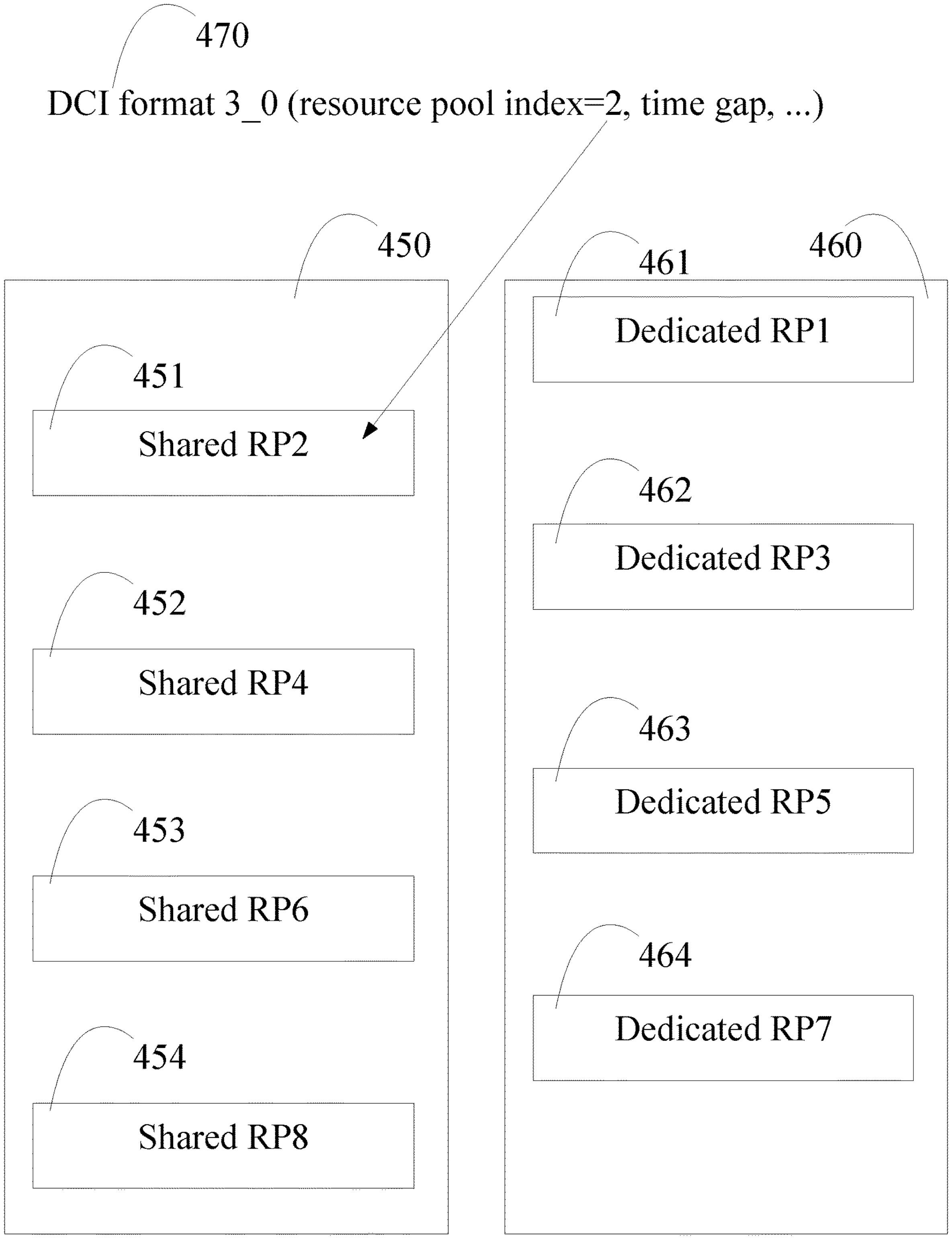
FIG. 4*b* shows, by way of example, a mapping between a resource allocation parameter and at least one resource pool.

FIG. 4*b* shows, by way of example, a mapping between a resource allocation parameter and at least one resource pool. In this example, an even resource allocation parameter corresponds to the first resource pool 450 and an odd resource allocation parameter corresponds to the second resource pool 460. For example, indices 1, 3, 5, 7, . . . may refer to the first resource pool 450 and shared resource pools 451, 452, 453, 454; and indices 2, 4, 6, 8, . . . may refer to the second resource pool 460 and dedicated resource pools 461, 462, 463, 464.

Let us consider an example, that the DCI 470 received by the UE is indicative of a resource allocation parameter or resource pool index "2". Thus, the index is even and corresponds to the shared RP2 451 in the first resource pool 450, i.e. the shared resource pool.

Alternatively to pattern or sequences of odd and even parameters, the pattern may be based on another sequence, for example, a modulus operation. For example, if the pattern is based on modulus 3 operation, the resource pools 0, 3, 6 may be determined as discovery resource pools, or as shared resource pools, depending on the pre-configuration. As another example, if the pattern is based on modulus 4 operation, the resource pools 0, 4 may be determined as discovery resource pools, or as shared resource pools, depending on the pre-configuration.

Figure 5:
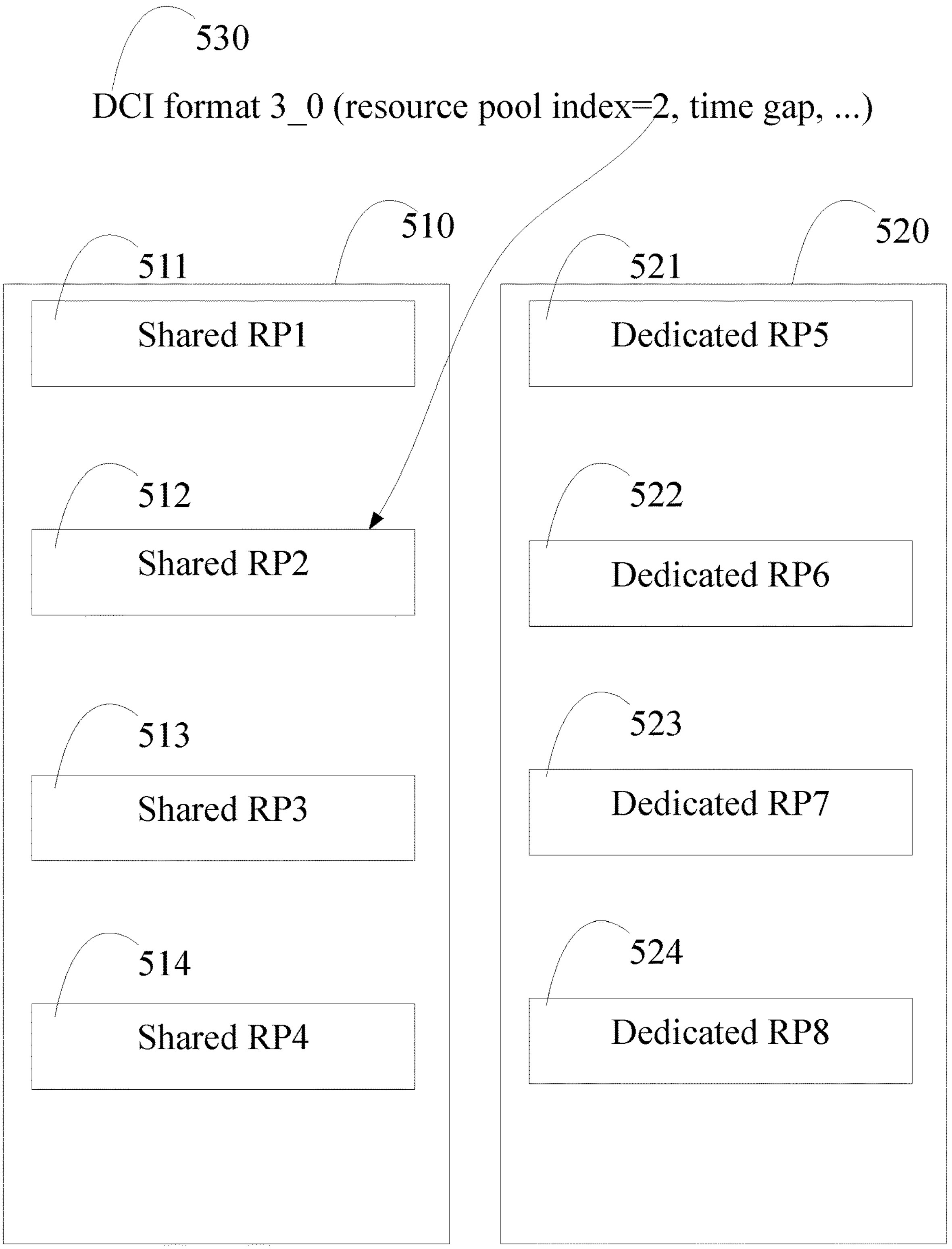
FIG. 5 shows, by way of example, a mapping between a resource allocation parameter and at least one resource pool.

FIG. 5 shows, by way of example, a mapping between a resource allocation parameter and at least one resource pool. The resource allocation parameter may be a value in a range comprising a first range and a second range. For example, the value may be an integer. The range may comprise, for example, integer values 1 to M, wherein M is the maximum number of transmission resource pools for sidelink communication and discovery. For example, the M may be 8 and the range my comprise values 1, 2, 3, 4, 5, 6, 7, 8. The first range may cover, for example, the first half of the resource pools, that is, 1 to 4. The second range may cover, for example, the second half of the resource pools, that is, 5 to 8. Then, a value in the first range may correspond to the first resource pool 510, and a value in the second range may correspond to the second resource pool 520. For example, indices 1, 2, 3, 4 may refer to the first resource pool 410 and shared resources pools 511, 512, 513, 514; and indices 5, 6, 7, 8 may refer to the second resource pool 520 and dedicated resource pools 521, 522, 523, 524.

Alternatively, a value in the first range may correspond to the second resource pool, and a value in the second range may correspond to the first resource pool.

Let us consider an example, that the DCI 530 received by the UE is indicative of a resource allocation parameter or resource pool index “2”. Thus, the index is a value in the first range and corresponds to the shared RP2 512 in the first resource pool 510, i.e. the shared resource pool.

Sizes of the first range and the second range may have been pre-determined or pre-configured. For example, as above, the size of the first range may be the first 50% of the whole range, and the size of the second range may be the second 50% of the whole range. Alternatively, the size of the first range may be, for example, the first 25% of the whole range and the size of the second range may be the remaining 75% of the whole range. The first 25% of the whole range would correspond to resource pools 1 and 2. The remaining 75% of the whole range would correspond to resource pools 3 to 8. Thus, the resource pool index 2 would correspond to the first resource pool, and the resource pool 4 would correspond to the second resource pool.

In an example, the M may be 6. It may have been defined that the first third of the whole range, i.e. resource pools 1 to 2, corresponds to the second resource pool, and the rest two thirds, i.e. resource pools 3 to 6, correspond to the first resource pool.

As an example, the sizes of the first range and the second range may depend on a channel busy ratio. If a channel is very congested with data traffic, a number of the resource pools dedicated for the discovery (resource pools in the second resource pool) may be set to be small by the network. If the congestion is lower, more resource pools may be dedicated for the discovery.

Figure 6:
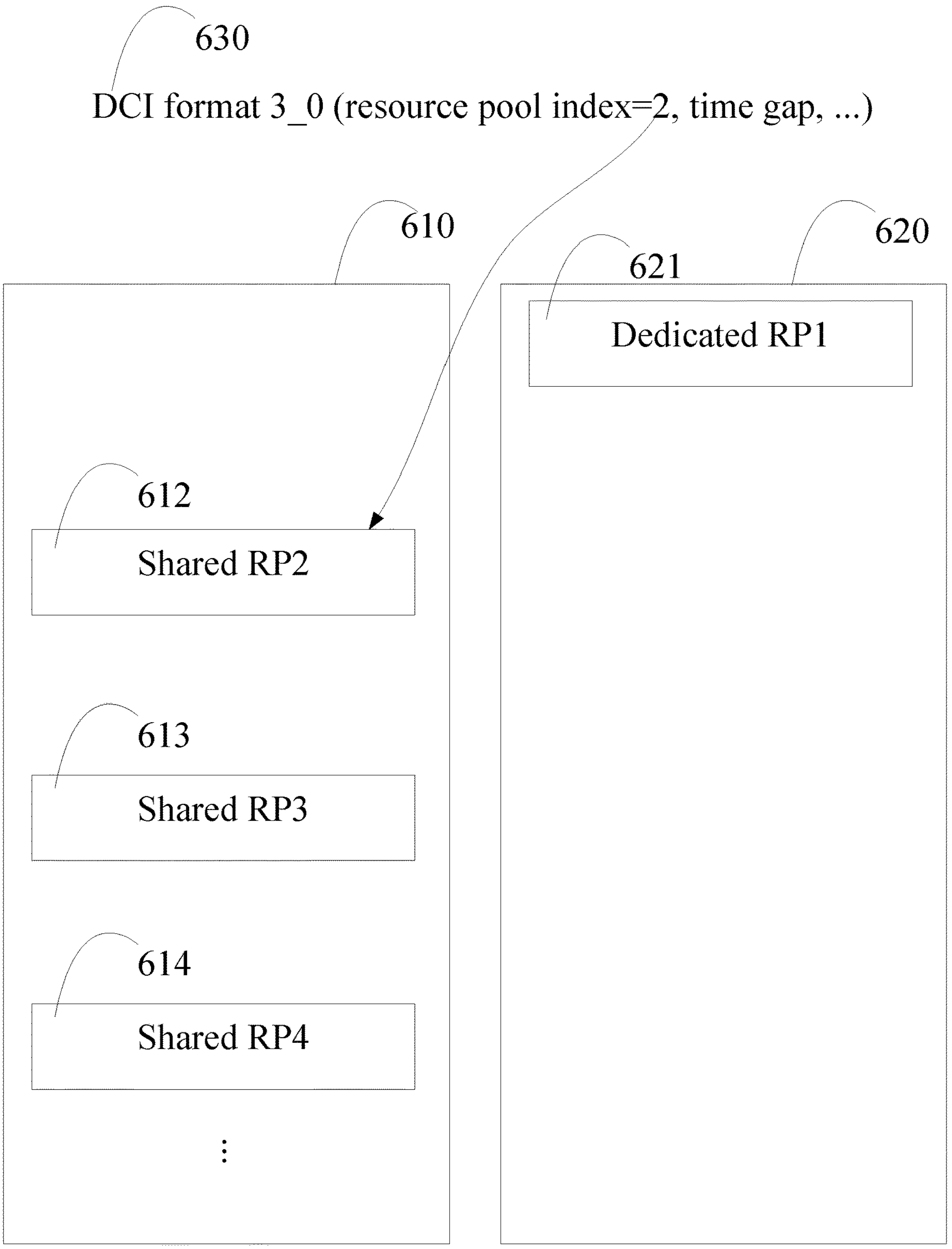
FIG. 6 shows, by way of example, a mapping between a resource allocation parameter and at least one resource pool.

FIG. 6 shows, by way of example, a mapping between a resource allocation parameter and at least one resource pool. The mapping may be pre-configured. Let us consider that a number of resource pools dedicated for the discovery has been pre-configured. For example, it may have been decided that there is a single discovery pool, e.g. only a single discovery pool, and that is always the dedicated RP1 621 in the second resource pool 620. Then, all the remaining resource pools may be allocated for the shared resource pool of the first resource pool 620 having shared RP2 612, shared RP3 613, and shared RP4 614. In other words, if dedicated resource pool is configured, it is always the dedicated RP1. In case of the resource pool index of DCI 630 being “2”, it would correspond to the shared RP2 612 in the shared resource pool.

As another example, a known number, e.g. 1, 2, or 3, of resource pools dedicated for discovery pools has been configured, and the corresponding dedicated RPs for discovery have been decided and pre-configured. For example, it may have been decided that if dedicated resources are configured, number of the resource pools is two, and those two resource pools are the dedicated RPs 1 and 2. In a scenario with excessive relay support, e.g. public safety scenario, for example four dedicated resource pools may be configured, and those four resource pools may be the dedicated RPs 1, 2, 3, 4.

Mapping between the resource allocation parameter and configured resource pool(s) may be at least partly based on another existing IE of the DCI. Intended resource pool may be indicated to the UE via another existing IE of the DCI than the resource pool index, which may point to a resource pool in a group of resource pools. The correct group of resource pools may be indicated by another existing IE of the DCI. For example, a time slot indicated in the DCI format 3_0 associated with the grant may be used for this purpose. For example, the resource allocation parameter may correspond to the first resource pool, if a time slot associated with a grant indicated in the DCI is odd; and the resource allocation parameter may correspond to the second resource pool, if a time slot associated with a grant indicated in the DCI is even.

Alternatively, the resource allocation parameter may correspond to the first resource pool, if a time slot associated with a grant indicated in the DCI is even; and the resource allocation parameter may correspond to the second resource pool, if a time slot associated with a grant indicated in the DCI is odd.

As another example, a time gap indicated in the DCI format 30 may be used to indicate the intended resource pool to the UE. The time gap is the number of slots between DCI reception and the first SL transmission scheduled by the DCI. For example, the resource allocation parameter may correspond to the first resource pool, if a time gap indicated in the DCI is odd; and the resource allocation parameter may correspond to the second resource pool, if a time gap indicated in the DCI is even.

Alternatively, the resource allocation parameter may correspond to the first resource pool, if a time gap indicated in the DCI is even; and the resource allocation parameter may correspond to the second resource pool, if a time gap indicated in the DCI is odd.

Figure 7:
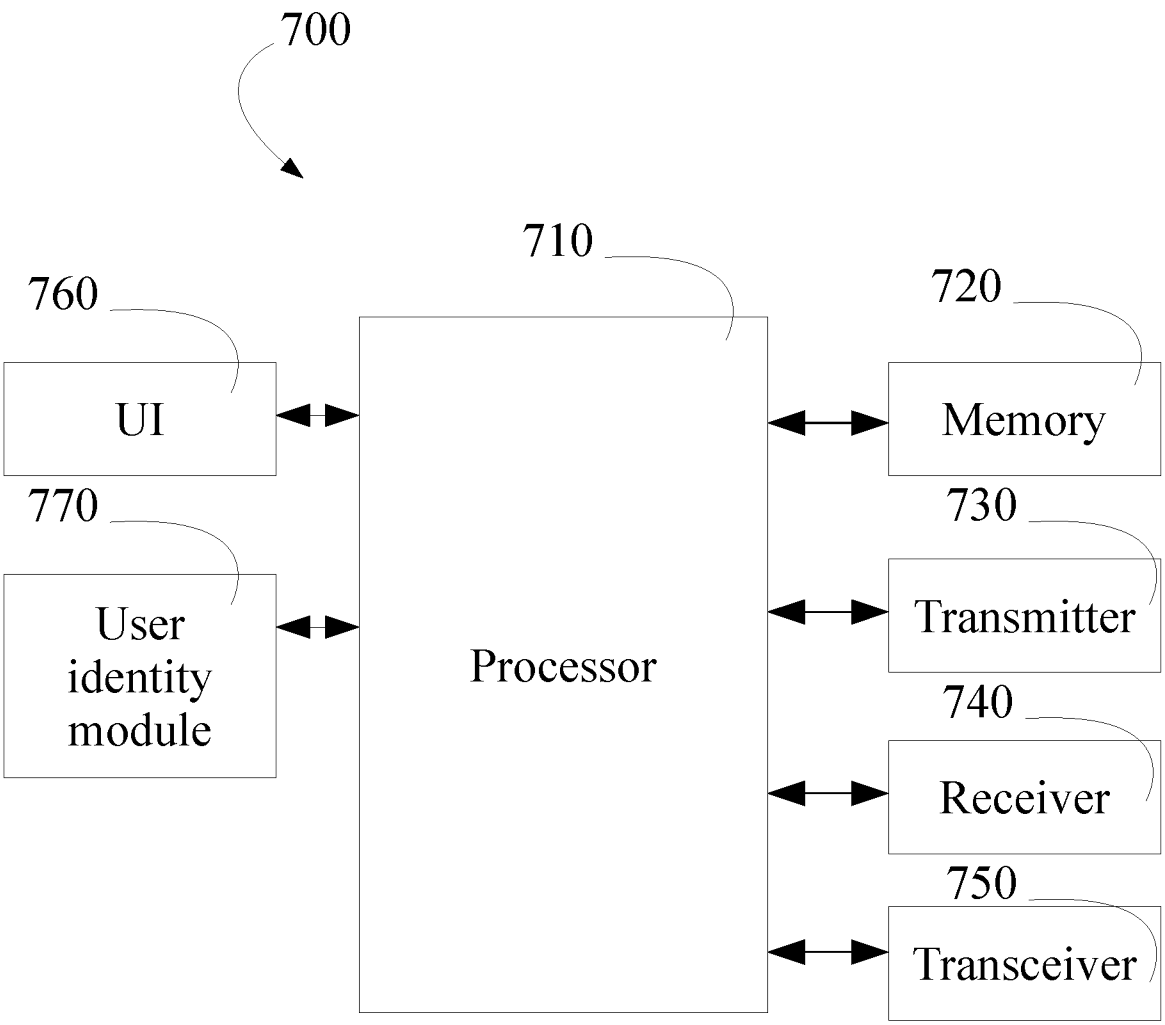
FIG. 7 shows, by way of example, a block diagram of an apparatus.

FIG. 7 shows, by way of example, a block diagram of an apparatus capable of performing the method as disclosed herein. Illustrated is device 700, which may comprise, for example, a mobile communication device such as UE 220 of FIG. 2 or UE 350 of FIG. 3*b*, or a network node, such as a network node 210 of FIG. 2 or a network node 360 of FIG. 3*b*. Comprised in device 700 is processor 710, which may comprise, for example, a single- or multi-core processor wherein a single-core processor comprises one processing core and a multi-core processor comprises more than one processing core. Processor 710 may comprise, in general, a control device. Processor 710 may comprise more than one processor. Processor 710 may be a control device. A processing core may comprise, for example, a Cortex-A8 processing core manufactured by ARM Holdings or a Steamroller processing core designed by Advanced Micro Devices Corporation. Processor 710 may comprise at least one Qualcomm Snapdragon and/or Intel Atom processor. Processor 710 may comprise at least one application-specific integrated circuit, ASIC. Processor 710 may comprise at least one field-programmable gate array, FPGA. Processor 710 may be means for performing method steps in device 700. Processor 710 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or network node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 700 may comprise memory 720. Memory 720 may comprise random-access memory and/or permanent memory. Memory 720 may comprise at least one RAM chip. Memory 720 may comprise solid-state, magnetic, optical and/or holographic memory, for example. Memory 720 may be at least in part accessible to processor 710. Memory 720 may be at least in part comprised in processor 710. Memory 720 may be means for storing information. Memory 720 may comprise instructions, such as computer instructions or computer program code, that processor 710 is configured to execute. When instructions configured to cause processor 710 to perform certain actions are stored in memory 720, and device 700 overall is configured to run under the direction of processor 710 using instructions from memory 720, processor 710 and/or its at least one processing core may be considered to be configured to perform said certain actions. Memory 720 may be at least in part external to device 700 but accessible to device 700.

Device 700 may comprise a transmitter 730. Device 700 may comprise a receiver 740. Transmitter 730 and receiver 740 may be configured to transmit and receive, respectively, information in accordance with at least one cellular or non-cellular standard. Transmitter 730 may comprise more than one transmitter. Receiver 740 may comprise more than one receiver. Transmitter 730 and/or receiver 740 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example.

Device 700 may comprise a near-field communication, NFC, transceiver 750. NFC transceiver 750 may support at least one NFC technology, such as NFC, Bluetooth, Wibree or similar technologies.

Device 700 may comprise user interface, UI, 760. UI 760 may comprise at least one of a display, a keyboard, a touchscreen, a vibrator arranged to signal to a user by causing device 700 to vibrate, a speaker and a microphone. A user may be able to operate device 700 via UI 760, for example to accept incoming telephone calls, to originate telephone calls or video calls, to browse the Internet, to manage digital files stored in memory 720 or on a cloud accessible via transmitter 730 and receiver 740, or via NFC transceiver 750, and/or to play games.

Device 700 may comprise or be arranged to accept a user identity module 770. User identity module 770 may comprise, for example, a subscriber identity module, SIM, card installable in device 700. A user identity module 770 may comprise information identifying a subscription of a user of device 700. A user identity module 770 may comprise cryptographic information usable to verify the identity of a user of device 700 and/or to facilitate encryption of communicated information and billing of the user of device 700 for communication effected via device 700.

Processor 710 may be furnished with a transmitter arranged to output information from processor 710, via electrical leads internal to device 700, to other devices comprised in device 700. Such a transmitter may comprise a serial bus transmitter arranged to, for example, output information via at least one electrical lead to memory 720 for storage therein. Alternatively to a serial bus, the transmitter may comprise a parallel bus transmitter. Likewise processor 710 may comprise a receiver arranged to receive information in processor 710, via electrical leads internal to device 700, from other devices comprised in device 700. Such a receiver may comprise a serial bus receiver configured to, for example, receive information via at least one electrical lead from receiver 740 for processing in processor 710. Alternatively to a serial bus, the receiver may comprise a parallel bus receiver.

Processor 710, memory 720, transmitter 730, receiver 740, NFC transceiver 750, UI 760 and/or user identity module 770 may be interconnected by electrical leads internal to device 700 in a multitude of different ways. For example, each of the aforementioned devices may be separately connected to a master bus internal to device 700, to allow for the devices to exchange information. However, as the skilled person will appreciate, this is only one example and depending on the embodiment various ways of interconnecting at least two of the aforementioned devices may be selected.

The term "non-transitory" as used herein, is a limitation of the medium itself (i.e., tangible, not a signal) as opposed to a limitation on data storage persistency (e.g., RAM vs. ROM).

As may be used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The invention claimed is:

1. A user equipment (UE) comprising:

at least one processor; and at least one memory storing instructions that, when executed by the at least one processor, cause the UE at least to:

receive a configuration indicative of at least a first resource pool and a second resource pool, wherein the first resource pool to be used for transmission in sidelink communication comprises at least one shared resource pool and the second resource pool to be used for discovery in the sidelink communication comprises at least one dedicated resource pool, wherein the at least one dedicated resource pool comprises at least one discovery resource pool, wherein the configuration is indicative of a unique mapping between individual resource pool indices and individual resource pools in the first resource pool and the second resource pool, an individual resource pool being an allocated one of the at least one shared resource pool of the first resource pool or the at least one dedicated resource pool of the second resource pool;

receive downlink control information comprising a resource pool index, wherein the downlink control information has downlink control information format 3_0;

determine, based on the received resource pool index and the mapping, an allocated resource pool in the first resource pool to use for transmission or in the second resource pool to use for discovery, wherein the resource pool index is odd or even, and wherein the resource pool indices in the unique mapping are integers, wherein the received resource pool index corresponds to an allocated one of the at least one shared resource pool in the first resource pool, in an instance in which a time gap indicated in the downlink control information is odd or the received resource pool index corresponds to an allocated one of the at least one dedicated resource pool in the second resource pool, in an instance in which a time gap indicated in the downlink control information is even;

based on determining that the allocated resource pool is in the first resource pool, perform transmission on the allocated resource pool in the first resource pool; and based on determining that the allocated resource pool is in the second resource pool, perform discovery on the allocated resource pool in the second resource pool, wherein the discovery is performed to find user equipment for sidelink communication, wherein an odd resource pool index corresponds to an allocated one of the at least one shared resource pool in the first resource pool, and wherein an even resource pool index corresponds to an allocated one of the at least one dedicated resource pool in the second resource pool, wherein the resource pool indices are values in a range comprising a first range and a second range, wherein a size of the first range is a first 50% of a whole range and a size of the second range is the second 50% of the whole range, wherein a value in the first range corresponds to an allocated one of the at least one shared resource pool in the first resource pool, a value in the second range corresponds to an allocated one of the at least one dedicated resource pool in the second resource pool, wherein sizes of the first range and the second range have been pre-configured or depend on a channel busy ratio, wherein for the mapping, some of the resource pool indices map to individual allocated ones of the at least one shared resource pool in the first resource pool, and remaining ones of the resource pool indices map to individual allocated ones of the at least one dedicated resource pool in the second resource pool.

* * * * *